United States Patent [19]
Inoue et al.

[11] 3,728,475
[45] Apr. 17, 1973

[54] BEAT SIGNAL SUPPRESSION SYSTEM FOR A SYSTEM FOR TRANSMITTING A FREQUENCY MODULATED WAVE OR A DEVICE FOR RECORDING AND REPRODUCING A FREQUENCY MODULATED WAVE

[75] Inventors: Yuzuru Inoue, Tokyo; Akiyoshi Morita, Yokohama, both of Japan

[73] Assignee: Victor Company of Japan, Limited, Yokohama, Japan

[22] Filed: July 6, 1970

[21] Appl. No.: 52,420

[30] Foreign Application Priority Data

July 4, 1969 Japan ........................44/53177

[52] U.S. Cl.......178/5.2 R, 178/5.4 CD, 179/100.2 K
[51] Int. Cl...........................H04n 5/78, G11b 5/04
[58] Field of Search..................325/46; 178/5.4 CD, 178/6.6 A, 5.2; 179/100.2 K

[56] References Cited

UNITED STATES PATENTS 2,986,597 5/1961 Teer ..............................178/5.2
3,305,627 2/1967 Krause ..............................178/5.2
3,333,055 7/1967 Krause..............................178/6.6 A
3,371,158 2/1968 Tanaka et al. ..................179/100.2 K

FOREIGN PATENTS OR APPLICATIONS 1,188,392 7/1967 Great Britain ..................178/5.4 CD

*Primary Examiner*—Robert L. Griffin
*Assistant Examiner*—John C. Martin
*Attorney*—Louis Bernat

[57] ABSTRACT

A system for transmitting or recording and reproducing a frequency modulated wave suppresses beats produced by a carrier wave and a signal component of high energy level distribution, which is disposed in a range of higher frequencies of a wave signal. A frequency component, which is liable to be reproduced as a beat signal, is subjected to pre-emphasis. A demodulated signal obtained by demodulating the frequency modulated signal is subject to deemphasis with a characteristic opposite to the pre-emphasis characteristics applied to the wave signal. Thus the frequency-phase characteristics of the signals is uniform throughout the system, whereby the influence exerted by moire beat interference on the demodulated signal can be minimized.

4 Claims, 8 Drawing Figures

INVENTORS
YUZURU INOUE
AKIYOSHI MORITA
BY [signature]
ATTORNEY

BEAT SIGNAL SUPPRESSION SYSTEM FOR A SYSTEM FOR TRANSMITTING A FREQUENCY MODULATED WAVE OR A DEVICE FOR RECORDING AND REPRODUCING A FREQUENCY MODULATED WAVE

This invention relates to beat signal suppression in systems for transmitting a or for magnetically recording and reproducing a frequency modulated wave signal. More particularly, the invention is concerned with a beat signal suppression system which eliminates a moire beat interfering signal produced in a demodulated signal by a carrier wave and a wave signal.

Generally, a frequency modulated wave is obtained by varying (modulating) the frequency of a carrier wave in accordance with the amplitude of a wave signal. The resulting wave form is used in a transmission system or a magnetic recording and reproducing device. Hitherto, it has been customary to pre-emphasize a signal component in a range of higher frequencies of the wave signal before effecting the frequency modulation. On demodulation a signal component in the range of higher frequencies is de-emphasized. This emphasis treatment effectively utilizes a given transmission band width (a recordable frequency band width in magnetic recording and reproducing devices) and at the same time improves the signal-to-noise ratio by reducing the noise in the high frequency range of the signal obtained by demodulation.

More particularly, a wave signal generally has a very low level distribution of energy in its higher frequency range. On the other hand, the noise level of a demodulated signal increases with a rise in frequency. Accordingly, if a wave signal frequency modulates a carrier wave at its original energy level distribution, a frequency modulated wave will have low frequency deviation as soon as the carrier wave is frequency modulated by the higher frequency range of the wave signal. Thus, the given transmission wave band cannot be fully utilized in such a case. The art of pre-emphasis and de-emphasis has hitherto been used for preventing a deterioration in the signal-to-noise ratio of a demodulated signal in its higher frequency range. This deterioration is caused by the introduction of a noise into the demodulated signal. The noise level distribution is amplified in proportion to the frequency.

Sometimes communication systems transmit a frequency modulated wave through a transmission path of narrow band width or devices for magnetically recording a frequency modulated wave. It has hitherto been customary to use a so-called low carrier wave residual side band wave frequency modulation system or some other similar system. A modulation index of a higher frequency range of a wave signal is reduced to a minimum when a carrier wave of a frequency, which is slightly higher than the maximum frequency of the wave signal, is frequency modulated by the wave signal. Such low carrier wave residual side band wave frequency modulation system has a disadvantage in that beats are liable to be produced because the carrier wave is close to the higher frequency range of the wave signal.

Particularly, when the wave signal has an energy distribution of high level in its higher frequency range, the beats produced by the carrier wave and the higher frequency ranges of wave signals constitute an interfering signal which disturbs the reception or reproduction of a demodulated signal.

The present invention is directed to suppressing beats signal produced by the phenomenon described above, so as to minimize the influence exerted by an interfering signal on a demodulated signal.

Accordingly, an object of this invention is to provide beat signal suppression in a system for transmitting or a device for magnetically recording and reproducing a frequency modulated wave signal. Here, an object is to prevent beat interfering signal in a demodulated signal.

Another object of the invention is to provide a beat signal suppression system which prevents the production of a beat interfering signal in a demodulated signal. In this connection, an object is to prevent beats caused by a carrier wave frequency modulated by a signal component, in a high frequency range, with an energy distribution of high level. Here an object is to maintain the signal-to-noise ratio of such demodulated signal at a satisfactory level.

Still another object of the invention is to provide a beat signal suppression system which completely prevents the production of a beat interfering signal when frequency modulated color television signals are transmitted a narrow band channel or are magnetically recorded and reproduced by means of a low carrier wave residual side band wave frequency modulation system.

Additional objects as well as features and advantages of the present invention will become evident from the description set forth hereinafter when considered in conjunction with the accompanying drawings, in which.

The system according to this invention will now be explained as being incorporated in a magnetic recording and reproducing device with reference to the drawings.

Figure 2:
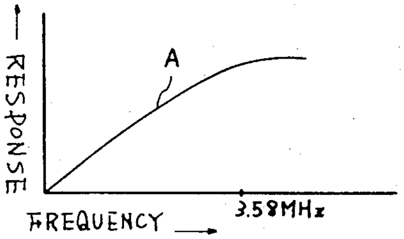
FIG. 2 is a diagram in explanation of ordinary pre-emphasis characteristics which are applied to a wave signal when frequency modulation is effected.

FIG. 2 shows an example of the pre-emphasis characteristics used by the invention. An increase in response occurs as the frequency becomes higher as indicated as a curve A.

A frequency modulated wave generally consists of a countless number of pairs of upper and lower side band waves. These bands are spaced apart from each other by a modulation angle frequency and the frequency component of a carrier wave at its center. Thus, a transmission path, having a band of infinite width, is ideally required for transmitting a frequency modulated wave.

However, the side band waves having a relatively large spectrum amplitude are concentrated in certain upper and lower ranges (the band widths occupied by the side band waves for practical use). The frequency of the carrier wave is disposed in the center. Outside such ranges, the spectrum amplitude of the side band waves could be set at zero because they are markedly attenuated. The band widths occupied by the side band waves, for practical use in a frequency modulated wave, is determined by the value of modulation index $m$.

Figure 1:
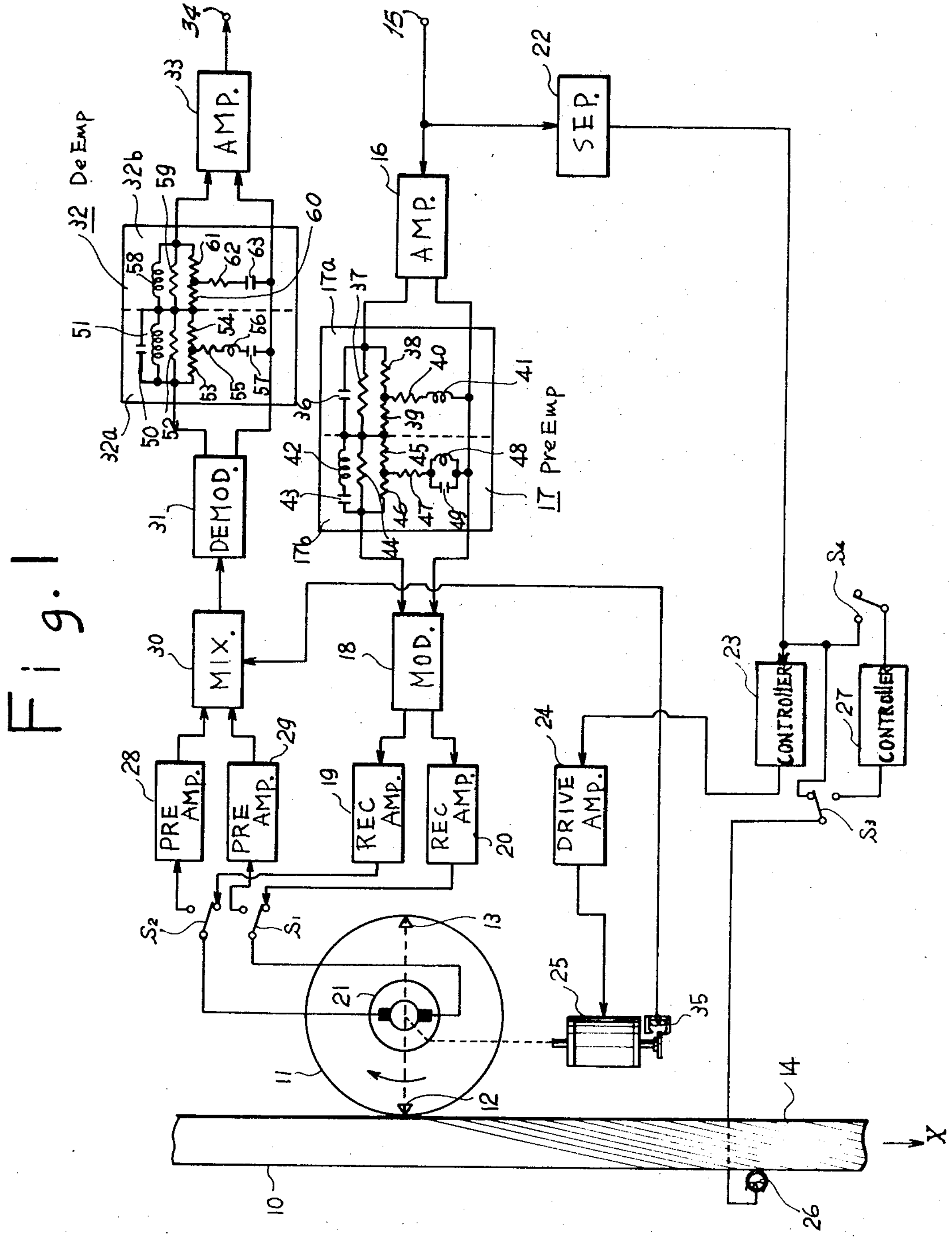
FIG. 1 is a systematic diagram showing a magnetic recording and reproducing device incorporating this invention.

FIG. 1 shows one type of magnetic recording and reproducing device to which this invention can be applied. The magnetic recording and reproducing device here shown comprises, for example, two video signal recording and reproducing magnetic heads 12 and 13. These heads are disposed in positions diametrically opposed to each other on the peripheral edge of a rotary member 11. Member 11 and heads 12, 13 rotate in the center of a cylindrical guide drum (not shown).

A magnetic tape 10 is brought into contact with the circumferential surface of the guide drum and moved obliquely over more than one-half of a circumferential extent (about 200°). The magnetic heads 12 and 13 magnetically record a video signal in magnetic tracks 14 on tape 10. These tracks are disposed obliquely with respect ot the longitudinal axis of the tape. Each track has a length sufficiently great to record and reproduce one field or one frame of the video signal on the tape.

Although not shown, suitable guide means and drive means are provided to guide the magnetic tape 10 in its travel over an oblique path along the rotary member 11, and to drive the tape in the direction of an arrow X. To facilitate an explanation, these means are shown diagrammatically in FIG. 1.

A signal to be recorded by such magntic recording and reproducing device, such as a video signal, is introduced through a terminal 15 and amplified by a recording amplifier 16. Then, the signal is pre-emphasized (as shown by a solid line curve F in FIG. 6) by a pre-emphasis network 17. The pre-emphasized signal is frequency modulated by a frequency modulator 18, and applied to frequency modulated wave recording amplifiers 19 and 20. The modulator 18 may be a low carrier wave residual side band frequency modulating system of a known design. Thereafter, the outputs of the amplifiers 19 and 20 are led through switches $S_1$ and $S_2$ to slip ring means 21, and applied to the magnetic heads 12 and 13 which record the same in the tracks 14 on the tape 10.

In the aforesaid recording operation, the synchronizing signal of the video signal is introduced through the terminal 15 and separated by a synchronizing signal separator 22 which produces a rectangular wave form (synchronizing signal). The rectangular wave is converted by a controller 23 into a sine wave. Then, the same wave is passed through a motor driving amplifier 24 to a motor 25 for rotating the rotary member 11. At the same time, the rectangular wave is introduced through a switch $S_3$ to a control signal recording and reproducing fixed magnetic head 26 and recorded in a marginal portion of the magnetic tape 10.

An operation for reproducing the signal recorded as aforementioned will now be explained. First, the switches $S_1$ to $S_4$ are closed, as compared to the positions shown in FIG. 1. Then, the magnetic tape 10 is moved in the same direction and at the same rate as it did in the recording operation. Thus, the rectangular wave recorded on the magnetic tape 10 is reproduced and converted into a sine wave by controllers 27 and 23. The sine wave is passed through the motor driving amplifier 24 and applied to the motor 25.

The motor rotates at a predetermined rate (30 r.p.s.). This rotation of the motor 25 causes the rotary magnetic heads 12 and 13 to scan the magnetic tape 10 and alternately trace the tracks 14 on the tape. Thus, the video signal is reproduced from the tracks 14 on the tape 10 by the magnetic heads 12 and 13. A frequency modulated wave signal alternately reproduced by the magnetic heads 12 and 13 is alternately applied to frequency modulated wave reproducing amplifiers 28 and 29 and introduced into a channel mixer 30. The outputs of the amplifiers 28 and 29 are connected to one another in the channel mixer 30. This forms a continuous signal which is applied to a demodulator 31. Then, the demodulated signal is de-emphasized, as shown by a dotted line curve G in FIG. 6, by a de-emphasis network 32. The de-emphasized signal is passed through a reproducing amplifier 33 and delivered to an output terminal 34.

A tone wheel 35 produces a pulse for each ½ rotation of the motor 25. This pulse is applied to the channel mixer 30 and ensures that the reproduced wave signals are positively connected together.

Hitherto, it has been customary for a magnetic recording and reproducing device to recorde and reproduce a video signal on a magnetic tape. The video signal is recorded as a frequency modulated wave signal, to prevent variations in the output level of the reproduced signal. Otherwise, signal variations would be caused by irregularities in the contact between the magnetic heads and magnetic tape, by variations in the characteristics and sensitivity between the two or more magnetic heads, and by variations in the thickness of a magnetic material coating the tape. To attain this end, the low carrier wave residual side band wave frequency modulation system has hitherto been used in many cases.

An NTSC video signal, to be recorded by such magnetic recording and reproducing device, has a high level energy distribution in a higher frequency range. Beats are liable to be produced by a carrier wave and a signal component having such a high level energy distribution in a high frequency range. The beats are reproduced as an interfering signal in the brightness signal band, which produces moire beat interference in the reproduced picture. These beats markedly degrading the reproduced picture.

Figure 3:
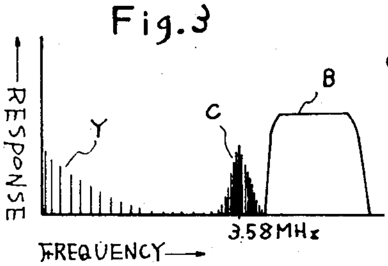
FIG. 3 is a diagram in explanation of the frequency spectrum distribution of a color video signal of the NTSC system and the band of a carrier wave.

As shown clearly by a frequency spectrum distribution in FIG. 3, an NTSC system color video signal comprises a chroma subcarrier wave C disposed in the high frequency range in the band of a brightness signal Y. The subcarrier is subjected to quadrature modulation by two color informations. That is, it has a high level energy distribution in the higher frequency range. This results in a carrier wave band designated B in FIG. 3. The chroma subcarrier wave C and its side band waves produce beats in a reproducing operation. The beats are reproduced as an interfering signal D in the band of the brightness signal Y. This causes a moire beat interference to occur in the reproduced picture.

Figure 4:
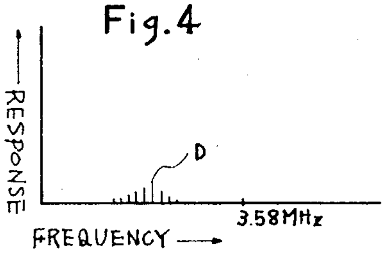
FIG. 4 is a diagram showing a beat interfering signal produced by a wave signal and a carrier wave related to each other as shown in FIG. 3, the interfering signal being produced in the band of the wave signal.

The interfering signal D is shown by itself in a spectrum distribution (FIG. 4).

Figure 5:
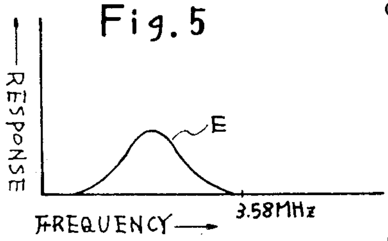
FIG. 5 is a diagram showing one example of pre-emphasis characteristics applied to a wave signal for preventing the production of the beat interfering signal shown in FIG. 4.

FIG. 5 shows one example of pre-emphasis characteristics to be applied to a wave signal in carrying the present invention into practice. A brightness signal component is disposed in the vicinity of the range of frequencies of the brightness signal Y. The interfering signal D is subjected to pre-emphasis as shown by a curve E in the figure.

Thus, the NTSC color video signal is subjected to pre-emphasis twice. Or, there is a pre-emphasis of different characteristics (as shown in FIG. 2 and FIG. 5), before being frequency modulated. Curve F (FIG. 6) shows a composite pre-emphasis characteristics produced from the pre-emphasis characteristics of FIG. 2 and the pre-emphasis characteristics of FIG. 5. The de-emphasis characteristics applied to the reproduced signal are shown as the dotted line curve G in FIG. 6.

Figure 6:
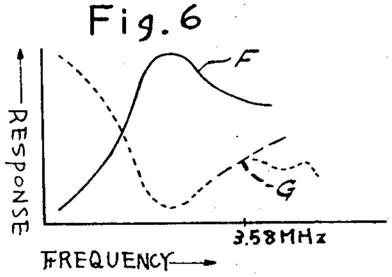
FIG. 6 is a diagram showing one example of pre-emphasis characteristics applied to a wave signal and de-emphasis characteristics applied to a demodulated signal.

The pre-emphasis network 17 (FIG. 1) is one example of a pre-emphasis networks adapted to produce the pre-emphasis characteristics shown as the curve F in FIG. 6. More particularly, this network comprises an ordinary pre-emphasis circuit 17a for producing the pre-emphasis characteristics shown in FIG. 2 and a second pre-emphasis circuit 17*b* for producing the pre-emphasis characteristics shown in FIG. 5. The de-emphasis network 32 is one example of a de-emphasis networks adapted to produce the de-emphasis characteristics, shown by the curve G in FIG. 6. The circuit 32 comprises an ordinary de-emphasis circuit 32*a* and a second de-emphasis circuit 32*b*, which produces de-emphasis characteristics exactly opposite to the pre-emphasis characteristics shown in FIG. 5.

According to this invention, the system is characterized by the provision of the pre-emphasis network 17 and de-emphasis network 32 in the recording system and reproducing system, respectively.

When a video signal is magnetically recorded on and reproduced from a magnetic tape, beats are liable to be produced by a carrier wave and a signal component having a high level energy distribution in a higher frequency range of the signal. The beats are reproduced as an interfering signal in a reproduced signal.

The present invention is effective to pre-emphasize the range of frequencies which is liable to be reproduced as beat interfering signal. The reproduced signal is de-energized to demodulate the frequency modulated wave signal in such a manner that the de-emphasis characteristics is opposite to the pre-emphasis characteristics to which the wave signal has been subjected. This makes a uniform frequency phase characteristics of the signals throughout the magnetic recording and reproducing device as a whole. Beats are suppressed to reduce the influence which the beat signal might otherwise exert on the reproduced signal.

The present invention has particular utility with an NTSC color video signal. More particularly, when the wave signal is an NTSC color video signal, a beat interfering signal is reproduced in the frequency range of the signal which has an energy distribution of low level. It is possible to pre-emphasize the component of the brightness signal, which corresponds to such range of frequencies, to a degree which eliminates beats. Therefore, the present invention minimizes moire beat interference in the reproduced picture, without degrading the signal-to-noise ratio. There is a degrading effect when the ordinary means for reducing moire beat interference, is adopted. These means involve the use of a frequency modulating carrier wave of higher frequency range or a reduction in the degree of modulation of the higher frequency range of the signal to be modulated.

The building blocks of the pre-emphasis network and de-emphasis network shown in FIG. 1 have the following constants:

RESISTORS

| | |
|---|---|
| 37, 52 | 1.5KΩ |
| 38, 39, 44, 45, 46, 47, 53, 54, 59, 60, 61, 62 | 1 KΩ |
| 40, 55 | 680Ω |

CAPACITORS

| | |
|---|---|
| 36 | 220 pF |
| 43, 49, 50, 57 | 120 pF |
| 63 | 100 pF |

COILS

| | |
|---|---|
| 41 | 220 μH |
| 42, 48, 51, 56, 58 | 100 μH |

Figure 7:
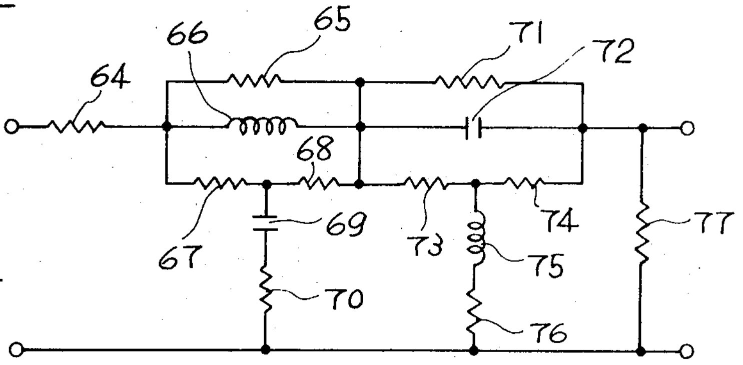
FIG. 7 shows another example of the pre-emphasis network.
Figure 8:
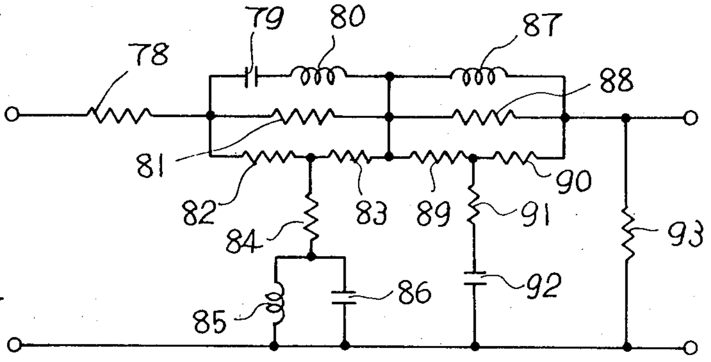
FIG. 8 shows another example of the de-emphasis network.

FIGS. 7 and 8 show another embodiment of the pre-emphasis network and the de-emphasis network of FIG. 1, respectively. The networks of FIGS. 7 and 8 can achieve the same results as the corresponding networks of FIG. 1 with a smaller number of parts used.

The building blocks of the networks of FIGS. 7 and 8 have the following constants:

RESISTORS

| | |
|---|---|
| 64 | 820Ω |
| 65, 71 | 3.3 KΩ |
| 67, 68, 73, 74, 77 | 1 KΩ |
| 70, 76 | 330Ω |
| 78, 82, 83, 89, 90, 93 | 390Ω |
| 81 | 560Ω |
| 84 | 270Ω |
| 88 | 1.2 KΩ |
| 91 | 120Ω |

CAPACITORS

| | |
|---|---|
| 69, 79 | 30 pF |
| 72 | 150 pF |
| 86 | 39 pF |
| 92 | 890 pF |

COILS

| | |
|---|---|
| 66, 80 | 39 μH |
| 75 | 150 μH |
| 85 | 27 μH |
| 87 | 130 μH |

From the foregoing description, it will be appreciated that the present invention permits effective suppression of beats produced by a frequency modulating carrier wave and a signal component of a wave signal disposed in the higher frequency range of the signal which has an energy distribution of high level. It also reduces the influence exerted by a beat interfering signal produced in a demodulated signal, while maintaining the signal-to-noise ratio of the demodulated signal at a satisfactory level. Thus, the present invention obviates the problem of a beat interfering signal which occurs when a color video signal of the NTSC system is frequency modulated and transmitted in a narrow band or magnetically recorded and reproduced by a low carrier wave residual side band wave frequency modulation system.

It is to be understood that the principles of the system, according to this invention, is effective to suppress beats, not only in a system for transmitting or magnetically recording and reproducing a frequency modulated wave, but also a system for transmitting or magnetically recording and reproducing a phase modulated wave.

It is also to be understood that the invention is not limited to the precise form of an embodiment described. Many changes and modifications may be made without departing from the spirit of the invention. Therefore, the appended claims should be understood to cover all such modifications equivalents and changes as may fall within the scope of this invention.

What we claim is:

1. A beat signal suppression system for a magnetic recording and reproducing apparatus which records and reproduces a wave signal having a high level energy distribution in its higher frequency range, said system comprising pre-emphasis circuit means for pre-emphasizing an undivided band of frequencies within the wave signal, modulator means for frequency-modulating a carrier frequency responsive to the output signal of said pre-emphasis circuit means, said pre-emphasized range of frequencies including a range of beat frequency signals between the carrier frequency and the frequencies of the high level energy range, said frequency range of the beat signal being lower than the higher frequency range of the wave signal, means for recording the frequency-modulated output signal of the modulator means on a magnetic medium, means for reproducing the recorded frequency-modulated signal from the magnetic medium, demodulator means for demodulating the reproduced frequency-modulated signal, and de-emphasis circuit means for de-emphasizing the output signal of said demodulator means, said de-emphasis circuit means having frequency characteristics which are opposite to the frequency characteristics of said pre-emphasis circuit means.

2. A beat signal suppression system as defined in claim 1 in which said wave signal is an NTSC color video signal recorded and reproduced by a magnetic recording and reproducing device by a low carrier wave residual side band wave frequency modulated system.

3. The beat signal suppression system as defined in claim 1 wherein said pre-emphasis circuit means has frequency characteristics in which a range of intermediate frequencies is emphasized with respect to a range of high frequencies.

4. The beat signal suppression system as defined in claim 1 wherein said wave signal is an NTSC color video signal, said pre-emphasis circuit means having frequency characteristics in which a range of intermediate frequencies is emphasized with respect to a range of frequencies near the subcarrier wave of said NTSC color video signal.

* * * * *